United States Patent
Xiao et al.

(10) Patent No.: US 9,621,806 B2
(45) Date of Patent: Apr. 11, 2017

(54) IMAGE CAPTURING METHOD, APPARATUS, AND ELECTRONIC DEVICE

(71) Applicant: TENCENT TECHNOLOGY (SHENZHEN) COMPANY LIMITED, Shenzhen (CN)

(72) Inventors: Bin Xiao, Shenzhen (CN); Hailong Liu, Shenzhen (CN); Wen Zha, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 8 days.

(21) Appl. No.: 14/597,343

(22) Filed: Jan. 15, 2015

(65) Prior Publication Data

US 2015/0138382 A1 May 21, 2015

Related U.S. Application Data

(63) Continuation of application No. PCT/CN2013/074515, filed on Apr. 22, 2013.

(30) Foreign Application Priority Data

Apr. 9, 2013 (CN) .......................... 2013 1 0121371

(51) Int. Cl.
*G02B 13/16* (2006.01)
*H04N 5/225* (2006.01)
*H04N 5/232* (2006.01)

(52) U.S. Cl.
CPC ..... *H04N 5/23258* (2013.01); *H04N 5/23222* (2013.01); *H04N 5/23293* (2013.01)

(58) Field of Classification Search
CPC ........... H04N 5/23258; H04N 5/23293; H04N 5/23222

(Continued)

(56) References Cited

U.S. PATENT DOCUMENTS

2011/0273572 A1 11/2011 Tsuchida
2011/0280556 A1* 11/2011 Ibi ...................... H04N 5/23251
396/53

(Continued)

FOREIGN PATENT DOCUMENTS

CN 101562697 A 10/2009
CN 102457675 A 5/2012

(Continued)

OTHER PUBLICATIONS

The State Intellectual Property Office of the People's Republic of China (SIPO) Office Action 1 for 201310121371.0 Nov. 3, 2015.

*Primary Examiner* — Yogesh Aggarwal
(74) *Attorney, Agent, or Firm* — Anova Law Group, PLLC

(57) ABSTRACT

Various embodiments provide methods, apparatus, and electronic devices for image capturing. An exemplary image capturing method can include first acquiring image information via a camera contained in an electronic device and then detecting whether a shake amplitude of the electronic device is within a pre-set range. When the shake amplitude of the electronic device is detected within the pre-set range, the image information acquired by the camera can be captured. An exemplary image capturing apparatus can include an acquisition module for acquiring image information; a first detection module for detecting whether a shake amplitude of an electronic device is within a pre-set range; and a capturing module for capturing the image information, when the first detection module detects that the shake amplitude of the electronic device is within the pre-set range.

17 Claims, 4 Drawing Sheets

(58) Field of Classification Search
USPC .............. 348/335, 340, 345, 348, 350, 352
See application file for complete search history.

(56) References Cited

U.S. PATENT DOCUMENTS

| | | | | |
|---|---|---|---|---|
| 2012/0002842 | A1* | 1/2012 | Murashita | H04N 5/23248 382/103 |
| 2013/0258122 | A1* | 10/2013 | Keane | H04N 5/23267 348/208.4 |

FOREIGN PATENT DOCUMENTS

| | | | |
|---|---|---|---|
| CN | 102509285 A | 6/2012 |
| CN | 102801915 A | 11/2012 |
| CN | 102984358 A | 3/2013 |
| CN | 103051836 A | 4/2013 |
| WO | 2008152814 A1 | 12/2008 |

\* cited by examiner

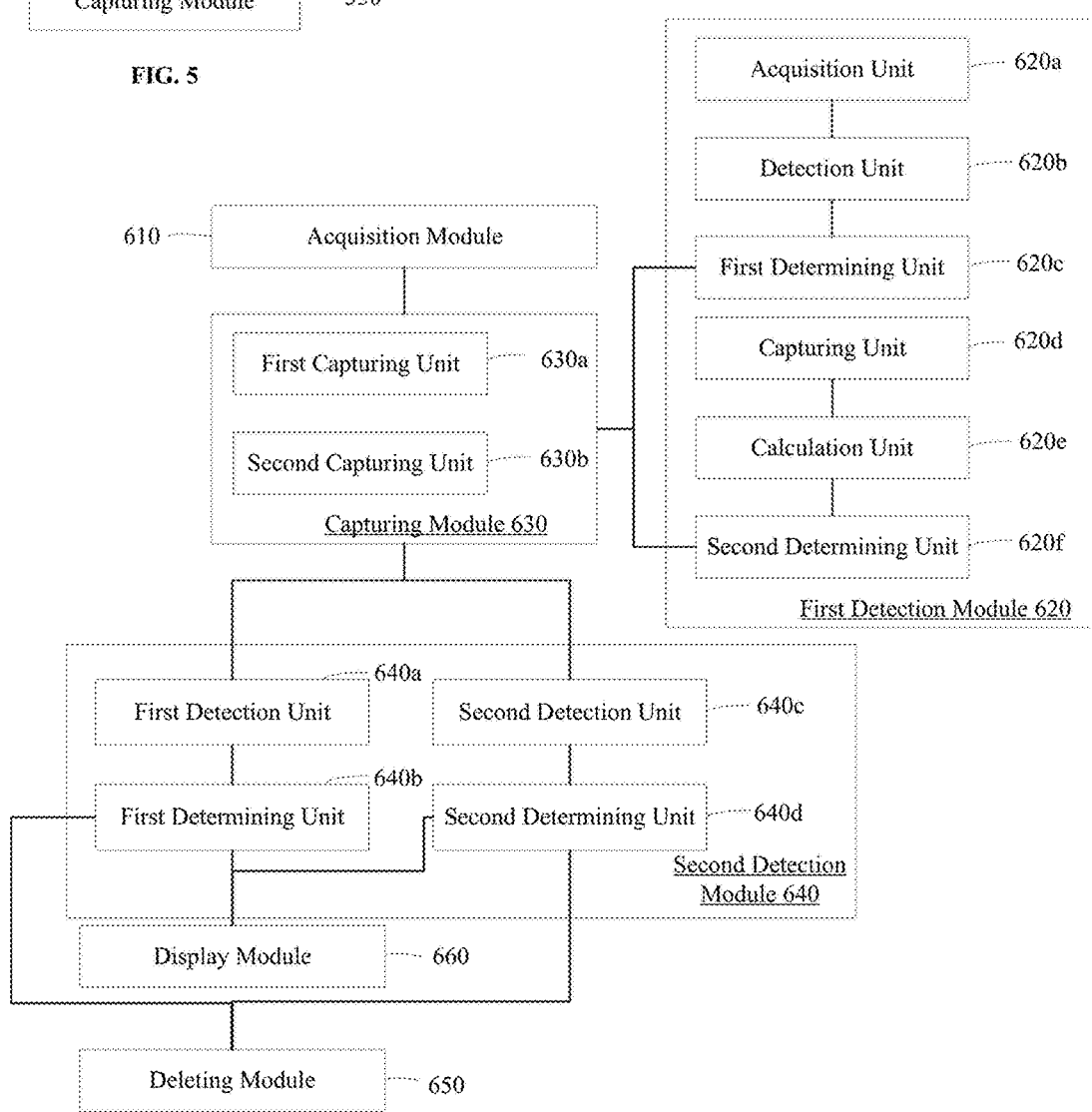

IMAGE CAPTURING METHOD, APPARATUS, AND ELECTRONIC DEVICE

CROSS-REFERENCES TO RELATED APPLICATIONS

This application is a continuation application of PCT Patent Application No. PCT/CN2013/074515, filed on Apr. 22, 2013, which claims priority to Chinese Patent Application No. CN201310121371.0, filed on Apr. 9, 2013, the entire contents of which are incorporated herein by reference.

FIELD OF THE DISCLOSURE

The present disclosure relates to the field of computer technology and, more particularly, relates to a method, apparatus, and electronic device for image capturing.

BACKGROUND

Currently, many electronic devices such as smart phones and tablet computers are all provided with a camera. A user can use the camera of such electronic devices to take a picture anytime and anywhere and to directly save the captured picture in a device storage medium or a network storage medium.

Conventional methods for using a camera to capture image information by a user may include the following process. First, the user turns on image capturing function of the electronic device. Accordingly, a camera of the electronic device starts acquiring an image of what is in front of the camera. Then, the user adjusts the position of the electronic device to bring an image-capturing target into focus of the camera of the electronic device. When the image-capturing target is determined, the electronic device is fixed in position and an image-capturing button is pressed. Accordingly, the electronic device captures the image of the image-capturing target when the user presses the image-capturing button.

Problems arise, however, because the user is required to manually press the image-capturing button when using the camera of the electronic device to capture the image information. For example, when pressing the image-capturing button, the user's hands may undesirably shake to cause the image captured by the electronic device blurry or otherwise unclear. Further, the image-capturing button is mechanically pressed each time the user captures the image information, which likely causes wear and tear to the image-capturing button and thereby reducing service life of the electronic device.

BRIEF SUMMARY OF THE DISCLOSURE

The present disclosure proposes methods, apparatus, and electronic devices for image capturing such that clear images can be captured via a camera contained in the electronic devices. Blurry images or otherwise unclear images, e.g., captured due to hand shaking, can be eliminated.

According to various embodiments, there is provided an image capturing method. In this method, image information can be acquired via a camera contained in an electronic device. It is then detected whether a shake amplitude of the electronic device is within a pre-set range. When the shake amplitude of the electronic device is detected within the pre-set range, the image information acquired by the camera can be captured.

According to various embodiments, there is also provided an image capturing apparatus. The image capturing apparatus can include an acquisition module, a first detection module, and a capturing module. The acquisition module can be configured to acquire image information via a camera of an electronic device. The first detection module can be configured to detect whether a shake amplitude of the electronic device is within a pre-set range. The capturing module can be configured to capture the image information acquired by the acquisition module via the camera, when the first detection module detects that the shake amplitude of the electronic device is within the pre-set range.

According to various embodiments, there is also provided a non-transitory computer-readable medium having computer program. When being executed by a processor, the computer program performs a method for image capturing. The method includes acquiring image information via a camera contained in an electronic device; detecting whether a shake amplitude of the electronic device is within a pre-set range; and capturing the image information acquired by the camera, when the shake amplitude of the electronic device is detected within the pre-set range.

As disclosed, by acquiring image information via a camera contained in an electronic device, the image information can first be acquired via the camera, and then captured when a shake amplitude of the electronic device is detected within a pre-set range. In this manner, a user does not need to press an image-capturing button when the electronic device captures the image information. The image capturing process performed by the user can thus be simplified. Since the captured image information is no longer affected by the user and the shake amplitude of the electronic device is within the pre-set range, the captured image can be sufficiently clear. Blurry images or otherwise unclear images, e.g., captured due to hand shaking of the user, can be eliminated.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the disclosure.

FIG. 5 depicts an exemplary image capturing apparatus in accordance with various disclosed embodiments;

FIG. 6 depicts another exemplary image capturing apparatus in accordance with various disclosed embodiments.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Methods, apparatus and electronic devices for image capturing are provided herein. An exemplary image capturing method can include first acquiring image information via a camera contained in an electronic device and then detecting whether a shake amplitude of the electronic device is within a pre-set range. When the shake amplitude of the electronic device is detected within the pre-set range, the image information acquired by the camera can be captured.

An exemplary image capturing apparatus can include an acquisition module for acquiring image information; a first detection module for detecting whether a shake amplitude of an electronic device is within a pre-set range; and a capturing module for capturing the image information, when the first detection module detects that the shake amplitude of the electronic device is within the pre-set range.

An exemplary electronic device can include the image capturing apparatus as disclosed herein. In this manner, when the electronic device captures the image information, a user does not need to press an image-capturing button. The image capturing process performed by the user can thus be simplified. Since the captured image information is no longer affected by the user and the shake amplitude of the electronic device is within the pre-set range, the captured image can be sufficiently clear. Blurry images or otherwise unclear images, e.g., captured due to hand shaking of the user, can be eliminated.

Figure 1:
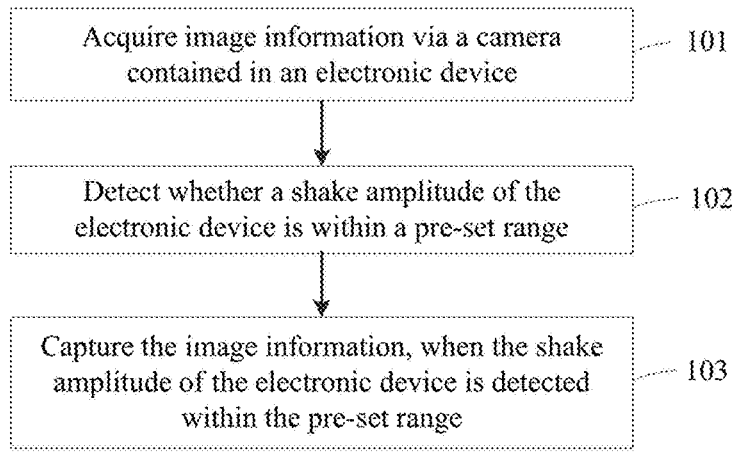
FIG. 1 depicts an exemplary method for capturing an image in accordance with various disclosed embodiments.
Figure 2:
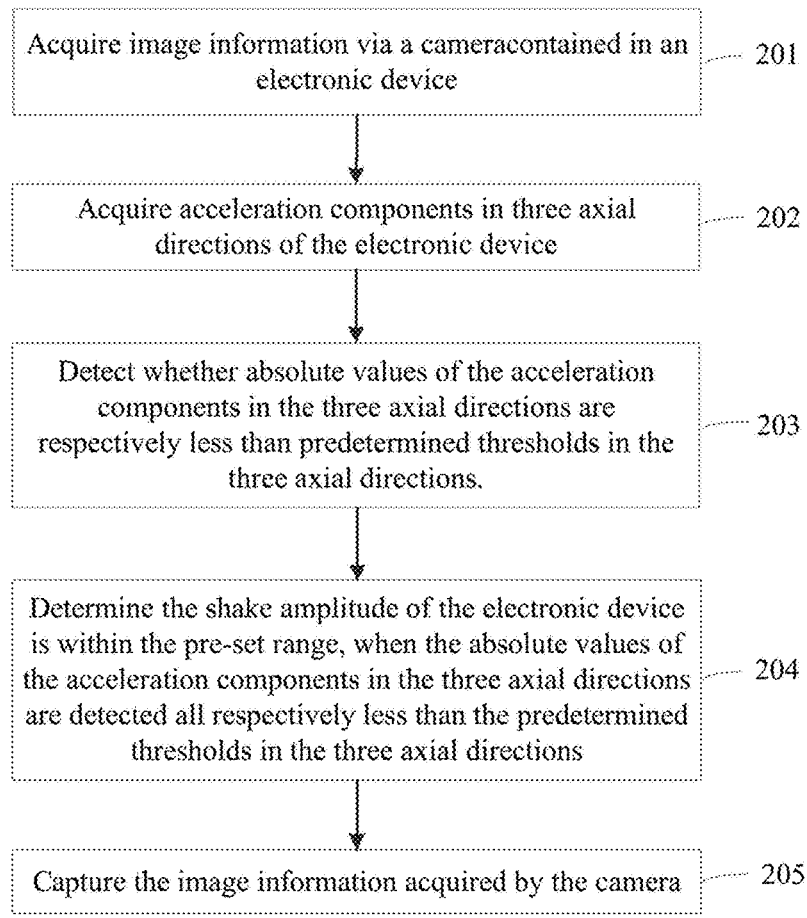
FIG. 2 depicts another exemplary method for capturing an image in accordance with various disclosed embodiments.
Figure 4:
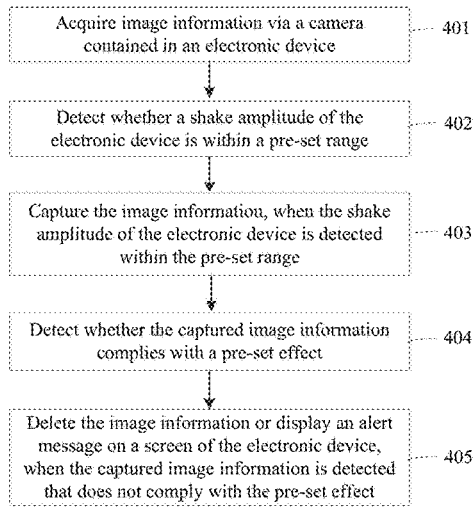
FIG. 4 depicts another exemplary method for capturing an image in accordance with various disclosed embodiments.

FIGS. 1-2 and 4 depict various exemplary methods for capturing an image in accordance with various disclosed embodiments. The exemplary image capturing methods as depicted herein can be implemented on any electronic device that contains a camera. Such electronic device can be, for example, a digital camera, a tablet computer, a mobile phone, a netbook, a personal computer, a laptop, a tablet pad, and the like.

Referring to FIG. 1, in Step 101, image information can be acquired via a camera contained in an electronic device. For example, when the camera of the electronic device is turned on, the electronic device can acquire the image information via the camera. In this case, continuous image information is often included in the image information acquired via the camera.

In Step 102, it is detected whether a shake amplitude of the electronic device is within a pre-set range. For example, when a detection result includes that the shake amplitude of the electronic device is within the pre-set range, the method depicted in FIG. 1 then proceeds to Step 103.

When a user handholds the electronic device, many times it is inevitable that the electronic device may shake. Accordingly, the electronic device can generate certain shake amplitude(s). The shake amplitude of the electronic device is then detected whether the shake amplitude is within the pre-set range. In various embodiments, such pre-set range can be set to be sufficiently narrow, so that when the shake amplitude of the electronic device is within such narrow pre-set range, the electronic device is considered as or determined to be in a stationary state.

When it is detected that the shake amplitude of the electronic device is within the pre-set range, i.e., the electronic device is considered as stationary, the method then proceeds to Step 103. In Step 103, when a detection result is that the shake amplitude of the electronic device is within the pre-set range, the image information acquired by the camera can be captured.

After the camera of the electronic device is turned on, the camera continuously acquires image information of what is in front of the camera (e.g., an image-capturing target as desired). At this point when it is detected that the shake amplitude of the electronic device is within the pre-set range, the image information acquired by the camera can be captured.

In this manner, the image information for what is before the camera can be acquired, and then captured when the shake amplitude of the electronic device is detected within the pre-set range. As such, when the electronic device captures the image information, a user does not need to press an image-capturing button. The image capturing process performed by the user can thus be simplified. Since the captured image information is no longer affected by the user and the shake amplitude of the electronic device is within the pre-set range, the captured image can be sufficiently clear. Blurry images or otherwise unclear images, e.g., captured due to hand shaking of the user, can be eliminated.

FIG. 2 depicts another exemplary method for capturing an image in accordance with various disclosed embodiments. For example, in Step 201, image information can be acquired via a camera contained in an electronic device. In one embodiment, when the camera of the electronic device is turned on, the electronic device can acquire the image information via the camera. In this case, continuous image information is often included in the image information acquired via the camera.

In Step 202, acceleration components in three axial directions of the electronic device can be acquired. For example, a sensor can be configured in the electronic device. When the sensor is used, a coordinate system can be established for the electronic device based on lines along directions of three sensitive axes of the sensor.

Figure 3:
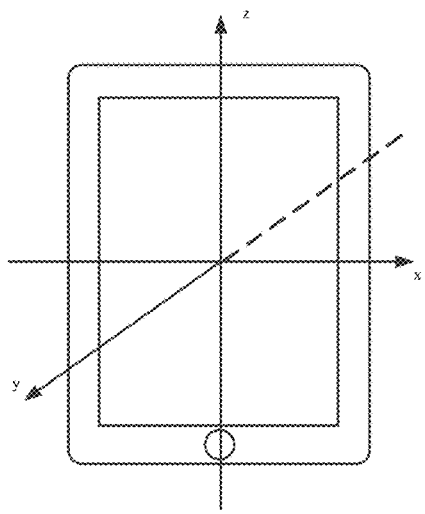
FIG. 3 is a schematic diagram illustrating a method for establishing a coordinate system for an electronic device in accordance with various disclosed embodiments.

FIG. 3 depicts an exemplary method for establishing a coordinate system for an electronic device in accordance with various disclosed embodiments. Usually, the directions of the three sensitive axes of the sensor in the electronic device can respectively correspond to the three directions including, length-wise (or length), width-wise (or width), and height-wise (or height) directions of the electronic device.

A terminal coordinate system established based on the directions of the sensitive axes can be as follows. For example, an interface of the electronic device can be set or used as an x-z plane. A center of gravity of the electronic device can be set as an origin of the coordinates. A positive half-axis of an x-axis can be set as pointing to a right side of the electronic device. A z-axis can be set as perpendicular to the x-axis on a flat surface of the electronic device. A positive half-axis of the z-axis can be set as pointing to an upper side of the electronic device in the x-z plane. A y-axis can be set as perpendicular to the x-z plane. A positive half-axis of the y-axis can be set as pointing to an upper side of the flat surface of the electronic device coming out of the x-z plane.

After obtaining acceleration a by the sensor, the acceleration a can be decomposed in the x-axis, y-axis, and z-axis directions to obtain acceleration components $a_x$, $a_y$, and $a_z$ in the three axial directions.

In Step 203, it can be detected whether absolute values of the acceleration components in the three axial directions are respectively less than corresponding predetermined thresholds in the three axial directions. When a detection result includes that the absolute values of the acceleration components in the three axial directions are all respectively less than the corresponding predetermined thresholds in the three axial directions, the method may then proceeds to Step 204.

Note that the acceleration components $a_x$, $a_y$, and $a_z$ are respectively set for the x-axis, y-axis and z-axis. The corresponding predetermined thresholds $a_{x0}$, $a_{y0}$, and $a_{z0}$ can be respectively set for the x-axis, y-axis and z-axis, where $a_{x0}$, $a_{y0}$, and $a_{z0}$ may be the same or different. It is detected whether the absolute value of $a_x$ is less than $a_{x0}$. When a detection result is YES, it can be determined that the absolute value of the acceleration component $a_x$ of the acceleration in the x-axis direction is less than the predetermined threshold $a_{x0}$ in the x-axis direction.

Likewise, whether the absolute value of the acceleration component $a_y$ of the acceleration in the y-axis direction is less than the predetermined threshold $a_{y0}$ in the y-axis direction; and whether the absolute value of the acceleration component $a_z$ of the acceleration in the z-axis direction is less than the predetermined threshold $a_{z0}$ in the z-axis direction can also be detected. When it is detected that the absolute values of the acceleration components in the three axial directions are all respectively less than the corresponding predetermined thresholds in the three axial directions, it can be determined that the shake amplitude of the electronic device is within the pre-set range.

In various embodiments, to ensure that the electronic device is substantially in a stationary state, the predetermined thresholds $a_{x0}$, $a_{y0}$, and $a_{z0}$ in the x-axis, y-axis and z-axis directions can be set relatively or sufficiently low, as desired. For example, each of $a_{x0}$, $a_{y0}$, and $a_{z0}$ can be set to be about 0.2 m/s$^2$. Of course, $a_{x0}$, $a_{y0}$, and $a_{z0}$ can be set to any other suitable values in accordance with various embodiments. Note that, when the z-axis is positioned as a straight line perpendicular to the ground (e.g., a floor), an acceleration component of gravitational acceleration needs to be taken into account for the predetermined thresholds $a_{z0}$ in the z-axis. That is, when the gravitational acceleration is about 9.8 m/s$^2$, the value of the acceleration component $a_{z0}$ can be in a range from about 9.6 m/s$^2$ to about 10 m/s$^2$.

In Step 204, when a detection result includes that the absolute values of the acceleration components in the three axial directions are all respectively less than the corresponding predetermined thresholds in the three axial directions, it can be determined that the shake amplitude of the electronic device is within the pre-set range. In Step 205, the image information acquired by the camera can be captured.

In various embodiments, to avoid capturing excessive image information, e.g., having images substantially the same (i.e., having duplicated images), the method for capturing the image information can be further described.

In one embodiment, starting from the time when it is detected that the shake amplitude of the electronic device is within the pre-set range, a predetermined number of frames of the image information can be captured according to a predetermined frequency. For example, image information can be captured at predetermined time intervals until the predetermined number of frames of image information is reached.

In another embodiment, within a predetermined period of time starting from the time when it is detected that the shake amplitude of the electronic device is within the pre-set range, the image information can be captured according to a predetermined frequency.

After the camera is turned on, the electronic device has been continuously acquiring image information. Therefore, when it is detected that the absolute values of the acceleration components in the three axial directions are all respectively less than the predetermined thresholds in the three axial directions, multiple frames of the image information can be captured according to the predetermined frequency.

In this manner, by detecting that the acceleration components in the three axial directions of the electronic device are all within the predetermined ranges, the image information acquired by the camera can be captured. As such, when the electronic device captures image information, a user does not need to press an image-capturing button. The image capturing process performed by the user can thus be simplified. Since the captured image information is no longer affected by the user and the shake amplitude of the electronic device is within the pre-set range, the captured image can be sufficiently clear. Blurry images or otherwise unclear images, e.g., captured due to hand shaking of the user, can be eliminated.

FIG. 4 depicts another exemplary method for capturing an image in accordance with various disclosed embodiments. In Step 401, image information can be acquired via a camera contained in an electronic device. For example, when the camera of the electronic device is turned on, the electronic device can acquire the image information via the camera. In this case, continuous image information is often included in the image information acquired via the camera.

In Step 402, it can be detected whether the shake amplitude of the electronic device is within the pre-set range.

When a user handholds the electronic device, many times it is inevitable that the electronic device may shake. Accordingly, the electronic device can generate certain shake amplitude(s). The shake amplitude of the electronic device is then detected whether the shake amplitude is within the pre-set range. In various embodiments, such pre-set range can be set to be sufficiently narrow, so that when the shake amplitude of the electronic device is within such narrow pre-set range, the electronic device is considered as or determined to be in a stationary state.

Various methods can be used for detecting whether the shake amplitude of the electronic device is within the pre-set range, i.e., to determine if the electronic device is considered stationary. In one embodiment, acceleration components in three (e.g., x-, y-, and z-) axial directions of the electronic device can be acquired. Then, whether absolute values of the acceleration components in the three axial directions are all respectively less than corresponding predetermined thresholds in the three axial directions can be detected. When a detection result includes that the absolute values of the acceleration components in the three axial directions are all respectively less than the corresponding predetermined thresholds in the three axial directions, it can be determined that the shake amplitude of the electronic device is within the pre-set range.

The acceleration components $a_x$, $a_y$, and $a_z$ are respectively set for the x-axis, y-axis and z-axis. The predetermined thresholds $a_{x0}$, $a_{y0}$, and $a_{z0}$ can be respectively set for the x-axis, y-axis and z-axis, where $a_{x0}$, $a_{y0}$, and $a_{z0}$ may be the same or different. It is detected whether the absolute value of $a_x$ is less than $a_{x0}$. When a detection result is YES, it can be determined that the absolute value of the acceleration component $a_x$ of the acceleration in the x-axis direction is less than the predetermined threshold $a_{x0}$ in the x-axis direction.

Likewise, whether the absolute value of the acceleration component $a_y$ of the acceleration in the y-axis direction is less than the predetermined threshold $a_{y0}$ in the y-axis direction; and whether the absolute value of the acceleration component $a_z$ of the acceleration in the z-axis direction is less than the predetermined threshold $a_{z0}$ in the z-axis direction can also be detected. When it is detected that the absolute values of the acceleration components in the three axial directions are all respectively less than the corresponding predetermined thresholds in the three axial directions, it can be determined that the shake amplitude of the electronic device is within the pre-set range.

In various embodiments, to ensure that the electronic device is substantially in a stationary state, the predetermined thresholds $a_{x0}$, $a_{y0}$, and $a_{z0}$ in the x-axis, y-axis and z-axis directions can be set relatively or sufficiently low, as desired. For example, each of $a_{x0}$, $a_{y0}$, and $a_{z0}$ can be set to be about 0.2 m/s$^2$. Of course, $a_{x0}$, $a_{y0}$, and $a_{z0}$ can be set to any other suitable values in accordance with various embodiments. Note that, when the z-axis is positioned as a straight line perpendicular to the ground (e.g., a floor), an acceleration component of gravitational acceleration needs to be taken into account for the predetermined thresholds $a_{z0}$ in the z-axis. That is, when the gravitational acceleration is about 9.8 m/s$^2$, the value of the acceleration component $a_{z0}$ can be in a range from about 9.6 m/s$^2$ to about 10 m/s$^2$.

In another exemplary method for detecting whether the shake amplitude of the electronic device is within the pre-set range, continuous n frames of acquired image information can be captured. Image similarity between every adjacent two frames of the continuous n frames of the image information can then be calculated, where n is a natural number greater than or equal to 2. When a calculation result includes that the image similarity between every adjacent two frames of the continuous n frames of the image information is greater than a predetermined threshold, it can be determined that the shake amplitude of the electronic device is within the pre-set range. In various embodiments, the image similarity can be obtained by calculation using a method including, for example, histogram matching, matrix factorization, and/or any other suitable methods.

After the camera is turned on, the electronic device has been continuously acquiring image information. Therefore, continuous n frames of the acquired image information can be captured. Usually, to ensure that the electronic device is in a substantially stationary state, the value of n can be set greater than or equal to 2. After n frames of the image information are captured, image similarity between every adjacent two frames of the image information can be calculated. That is, after capturing continuous n frames of the image information, the image similarity between a frame j of the image information and a frame (j+1) of the image information can be calculated, where j is a number greater than 0 and less than n.

When a calculation result includes that the image similarity between every adjacent two frames of the continuous n frames of the image information is greater than a predetermined threshold, it can be determined that the shake amplitude of the electronic device is within the pre-set range. When it is detected that the shake amplitude of the electronic device is within the pre-set range, the exemplary method then proceeds to Step 403.

In Step 403, when a detection result includes that the shake amplitude of the electronic device is within the pre-set range, the image information acquired by the camera can be captured. In various embodiments, to avoid capturing undesired excessive image information having images substantially the same (e.g., having substantially duplicated images with no big differences there-between), the method for capturing the image information can be further described.

In one embodiment, starting from the time when it is detected that the shake amplitude of the electronic device is within the pre-set range, a predetermined number of frames of the image information can be captured according to a predetermined frequency. For example, image information can be captured at predetermined time intervals until the predetermined number of frames of image information is reached.

In another embodiment, within a predetermined period of time starting from the time when it is detected that the shake amplitude of the electronic device is within the pre-set range, image information can be captured according to a predetermined frequency.

After the camera is turned on, the electronic device has been continuously acquiring image information. Therefore, when it is detected that the absolute values of the acceleration components in the three axial directions are all respectively less than the corresponding predetermined thresholds in the three axial directions, multiple frames of the image information can be captured according to the predetermined frequency.

In Step 404, it can be detected whether the captured image information complies with a pre-set effect. When a detection result includes that the captured image information does not comply with the pre-set effect, the method then proceeds to Step 405.

Various methods for detecting whether the captured image information complies with the pre-set effect can be used in accordance with various embodiments. In an exemplary method for detecting whether the captured image information complies with the pre-set effect, it can be detected whether the captured image information contains a predetermined shape. When a detection result includes that the captured image information does not contain the predetermined shape, the detection result can be determined as that the image information does not comply with the pre-set effect.

As disclosed herein, examples of the predetermined shape can include, but be not limited to, a circular shape, an elliptical shape, a triangular shape, a rectangular shape, a polygonal shape having another predetermined number of sides, and/or the like. In one embodiment, when it is desired to acquire image information of a book, the predetermined shape in the pre-set effect can be set as a rectangular shape. In the case when a detection result includes that the captured image information does not contain a rectangular shape, it can be determined that the image information does not comply with the pre-set effect.

In another exemplary method for detecting whether the captured image information complies with the pre-set effect, it can be detected whether values of image elements in the captured image information are within corresponding predetermined ranges. The image elements can include, for example, pixels, brightness, hue, saturation, and/or other suitable image elements without limitation. When a detection result includes that the values of the image elements in the captured image information are not within the predetermined ranges, the detection result can be determined as that the image information does not comply with the pre-set effect.

In one embodiment, the value of the brightness of the image information can be set to be within a predetermined range, for example, set to be greater than or equal to about 100 and less than or equal to about 110; and/or the value of the saturation of the image information can be set to be within a predetermined range, for example, set to be greater than or equal to about 105 and less than or equal to about 115.

As disclosed herein, the pre-set effect can be set by a default setting of the electronic device and/or can be manually set by a user. For example, the electronic device can set the values of the image elements such as pixel, brightness, hue and/or saturation of the image information. In another example, a user can manually set a shape in the image information and/or can manually set the values of the image elements such as pixel, brightness, hue, and/or saturation of the image information. When the values of the image elements in the image information satisfy the set standards, it can be determined that the captured image information complies with the pre-set effect.

In Step 405, when a detection result includes that the captured image information does not comply with the pre-set effect, the image information can be deleted and/or an alert message can be displayed on a screen of the electronic device. For example, when the detection result includes that the image information does not comply with the pre-set effect, the image information can be deleted to avoid occupying device storage space of the electronic device with the image information that does not meet user's expectation and/or with the image information having undesired low quality.

In another example, when the detection result includes that the image information does not comply with the pre-set effect, an alert message can be displayed on the screen of the electronic device. The alert message can include descriptions regarding the image elements of the image information. For example, the alert message can include (or be similar to) the descriptions of that: a value of the current saturation is about 115; a value of the standard saturation is about 130; the current brightness is 80; and/or the standard brightness is 105. Of course, the alert message can further include descriptions about a shape or other elements set in the image. For example, the alert message can include (or be similar to) the descriptions of that: the image information does not contain a rectangular shape; the image information does not contain a triangular shape; and/or the like. In a further example, the alert message can include (or be similar to) the descriptions of that: the image information does not comply with the pre-set effect, please adjust the angle and height of the camera.

Based on the displayed alert message(s), the user can adjust the electronic device and/or the camera accordingly such that the image information captured by the electronic device can meet the user's needs. Further, when the electronic device detects that the image information does not comply with the pre-set effect, the user can be timely alerted. Therefore, capturing excessive image information that does not comply with the pre-set effect can be avoided, which can save storage space of the electronic device.

In this manner, when it is detected that the shake amplitude of the electronic device is within the pre-set range, the image information can be captured. Further, whether the captured image information complies with the pre-set effect is detected. When the captured image information does not comply with the pre-set effect, the image information can be deleted and/or an alert message can be displayed on the screen of the electronic device. As such, the image information captured by the electronic device can be sufficiently clear as desired. In addition, since the captured image information that does not comply with the pre-set effect is deleted, the images with high quality can be stored and the storage space of the electronic device can be saved as desired.

FIG. 5 depicts an exemplary image capturing apparatus in accordance with various disclosed embodiments. The exemplary image capture apparatus can be implemented as an electronic device or a part of an electronic device, which contains a camera. Such electronic device can be a digital camera, a tablet computer, a mobile phone, a netbook, a personal computer, a laptop, a tablet pad, and the like. The exemplary image capture apparatus can include an acquisition module 510, a first detection module 520, and/or a capturing module 530.

The acquisition module 510 can be used to acquire image information via the camera. The first detection module 520 can be used to detect whether a shake amplitude of the electronic device is within a pre-set range. When a detection result of the first detection module 520 includes that the shake amplitude of the electronic device is within the pre-set range, the capturing module 530 can be used to capture the image information acquired by the acquisition module 510 via the camera.

By acquiring image information of what is in front of the camera, the acquired image information can be captured, when it is detected that the shake amplitude of the electronic device is within the pre-set range. As such, when the electronic device captures the image information, a user does not need to press an image-capturing button. The image capturing process performed by the user can thus be simplified. Since the captured image information is no longer affected by the user and the shake amplitude of the electronic device is within the pre-set range, the captured image can be sufficiently clear. Blurry images or otherwise unclear images, e.g., captured due to hand shaking of the user, can be eliminated.

FIG. 6 depicts another exemplary image capturing apparatus in accordance with various disclosed embodiments. The exemplary image capture apparatus can be implemented as an electronic device or a part of an electronic device that contains a camera. Such electronic device can be a digital camera, a tablet computer, a mobile phone, a netbook, a personal computer, a laptop, a tablet pad, and the like. The exemplary image capture apparatus can include an acquisition module 610, a first detection module 620, a capturing module 630, a second detection module 640, a deleting module 650, and/or a display module 660.

The acquisition module 610 can be used to acquire image information via the camera. The first detection module 620 can be used to detect whether a shake amplitude of the electronic device is within a pre-set range. In one embodiment, the first detection module 620 can include an acquisition unit 620*a*, a detection unit 620*b*, and/or a first determining unit 620*c*.

The acquisition unit 620*a* can be used to acquire acceleration components in three axial directions of the electronic device. The detection unit 620*b* can be used to detect whether absolute values of the acceleration components in the three axial directions acquired by the acquisition unit 620*a* are respectively less than corresponding predetermined thresholds in the three axial directions.

When a detection result of the detection unit 620*b* includes that the absolute values of the acceleration components in the three axial directions are all respectively less than the predetermined thresholds in the three axial directions, the first determining unit 620*c* can be used to determine that the shake amplitude of the electronic device is within the pre-set range.

In one embodiment, the first detection module 620 can include a capturing unit 620*d*, a calculation unit 620*e*, and/or a second determining unit 620*f*.

The capturing unit 620*d* can be used to capture continuous n frames of the image information acquired by the acquisition module 610. The calculation unit 620*e* can be used to calculate an image similarity between adjacent two frames of the continuous n frames of the image information captured by the capturing unit 620d, where n is a natural number greater than or equal to 2.

When a calculation result of the calculation unit 620e includes that the image similarity between every adjacent two frames of the continuous n frames of the image information is greater than the predetermined threshold, the second determining unit 620f can be used to determine that the shake amplitude of the electronic device is within the pre-set range.

When a detection result of the first detection module 620 includes that the shake amplitude of the electronic device is within the pre-set range, the capturing module 630 can be used to capture the image information acquired by the acquisition module 610 via the camera.

In one embodiment, the capturing module 630 can include a first capturing unit 630a, and/or a second capturing unit 630b. The first capturing unit 630a can be used to capture, according to a predetermined frequency, a predetermined number of frames of the image information acquired by the acquisition module 610 via the camera, starting from the time when the first detection module 620 detects that the shake amplitude of the electronic device is within the pre-set range.

The second capturing unit 630b can be used to capture, according to a predetermined frequency, the image information acquired by the acquisition module 610 via the camera, within a predetermined period of time starting from the time when the first detection module 620 detects that the shake amplitude of the electronic device is within the pre-set range.

The second detection module 640 can be used to detect whether the captured image information complies with the pre-set effect. In one embodiment, the second detection module 640 can include a first detection unit 640a and/or a first judging unit 640b.

The first detection unit 640a can be used to detect whether the image information captured by the capturing module 630 contains a predetermined shape. Examples of the predetermined shape can include, but be not limited to, a circular shape, an elliptical shape, a triangular shape, a rectangular shape, a polygonal shape having another predetermined number of sides, and/or the like.

When a detection result of the first detection unit 640a includes that the captured image information does not contain a predetermined shape, the first judging unit 640b can be used to determine the detection result that the image information does not comply with the pre-set effect.

In one embodiment, the second detection module 640 can further include a second detection unit 640c and/or a second judging unit 640d. The second detection unit 640c can be used to detect whether values of image elements of the image information captured by the capturing module 630 are within predetermined ranges. The image elements can include pixels, brightness, hue, and/or saturation.

When a detection result of the second detection unit 640c includes that the values of the image elements of the captured image information are not within the predetermined ranges, the second judging unit 640d can be used to determine the detection result that the image information does not comply with the pre-set effect.

When a detection result of the second detection module 640 includes that the image information does not comply with the pre-set effect, the deleting module 650 can be used to delete the image information. When a detection result of the second detection module 640 includes that the image information does not comply with the pre-set effect, the display module 660 can be used to display an alert message on a screen of the electronic device.

By detecting that the acceleration components in the three axial directions of the electronic device are all within the predetermined ranges, the image information acquired by the camera can be captured. As such, when the electronic device captures image information, a user does not need to press an image-capturing button. The image capturing process performed by the user can thus be simplified. Since the captured image information is no longer affected by the user and the acceleration components in the three axial directions of the electronic device are within the pre-set range, the captured image can be sufficiently clear. Blurry images or otherwise unclear images, e.g., captured due to hand shaking of the user, can be eliminated.

In various embodiments, the disclosed modules for image capturing can be configured in one device or configured in multiple devices as desired. The modules disclosed herein can be integrated in one module or in multiple modules for image capturing. Each of the modules disclosed herein can be divided into one or more sub-modules, which can be recombined in any manner.

The disclosed embodiments can be examples only. One of ordinary skill in the art would appreciate that suitable software and/or hardware (e.g., a universal hardware platform) may be included and used to predict, manage, and execute the disclosed schemes. For example, the disclosed embodiments can be implemented by hardware only, which alternatively can be implemented by software products only. The software products can be stored in a storage medium. The software products can include suitable commands to enable a terminal device (e.g., including a mobile phone, a personal computer, a server, or a network device, etc.) to implement the disclosed embodiments.

Figure 7:
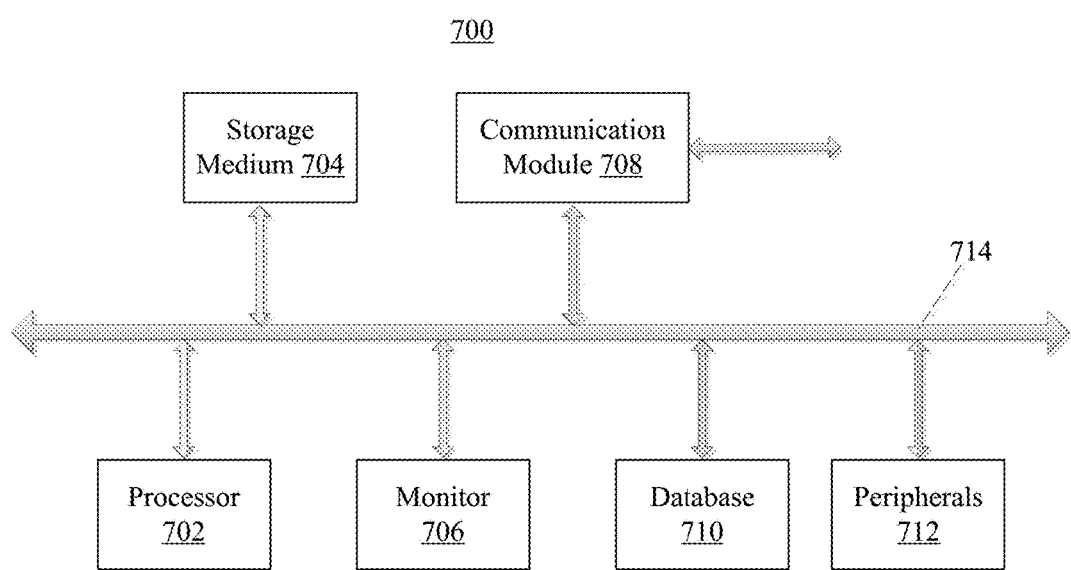
FIG. 7 depicts an exemplary computing system used for an image capturing apparatus and/or an electronic device in accordance with various disclosed embodiments.

In various embodiments, the image capturing apparatus and/or the electronic device may be implemented on any appropriate computing platform. FIG. 7 shows a block diagram of an exemplary computing system 700 capable of the image capturing apparatus and/or the electronic device. As shown in FIG. 7, the exemplary computing system 700 may include a processor 702, a storage medium 704, a monitor 706, a communication module 708, a database 710, peripherals 712, and one or more bus 714 to couple the devices together. Certain devices may be omitted and other devices may be included.

Processor 702 can include any appropriate processor or processors. Further, processor 702 can include multiple cores for multi-thread or parallel processing. Storage medium 704 may include memory modules, such as ROM, RAM, and flash memory modules, and mass storages, such as CD-ROM, U-disk, removable hard disk, etc. Storage medium 704 may store computer programs for implementing various processes, when executed by processor 702.

Further, peripherals 712 may include I/O devices such as keyboard and mouse, and communication module 708 may include network devices for establishing connections through a communication network. Database 710 may include one or more databases for storing certain data and for performing certain operations on the stored data, such as webpage browsing, database searching, etc.

Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Methods, apparatus and electronic devices for image capturing are provided herein. An exemplary image capturing method can include first acquiring image information via a camera contained in an electronic device and then detecting whether a shake amplitude of the electronic device is within a pre-set range. When the shake amplitude of the electronic device is detected within the pre-set range, the image information acquired by the camera can be captured. An exemplary image capturing apparatus can include an acquisition module for acquiring image information; a first detection module for detecting whether a shake amplitude of an electronic device is within a pre-set range; and a capturing module for capturing the image information, when the first detection module detects that the shake amplitude of the electronic device is within the pre-set range. An exemplary electronic device can include the image capturing apparatus as disclosed herein.

In this manner, when the electronic device captures the image information, a user does not need to press an image-capturing button. The image capturing process performed by the user can thus be simplified. Since the captured image information is no longer affected by the user and the shake amplitude of the electronic device is within the pre-set range, the captured image can be sufficiently clear. Blurry images or otherwise unclear images, e.g., captured due to hand shaking of the user, can be eliminated.

What is claimed is:

1. An image capturing method, comprising:
    automatically acquiring image information via a camera contained in an electronic device when the camera is turned on;
    detecting whether a shake amplitude of the electronic device is within a pre-set range; and
    automatically capturing the image information acquired by the camera, when the shake amplitude of the electronic device is detected within the pre-set range, the captured image information being a picture captured by the camera;
    wherein detecting whether the shake amplitude of the electronic device is within the pre-set range comprises:
    capturing continuous n frames of acquired image information;
    calculating an image similarity between adjacent two frames of the continuous n frames of the image information, wherein n is a natural number greater than 2; and
    determining the shake amplitude of the electronic device is within the pre-set range, when the image similarity between every adjacent two frames of the continuous n frames is greater than a predetermined threshold.

2. The method of claim 1, wherein detecting whether the shake amplitude of the electronic device is within the pre-set range comprises:
    acquiring acceleration components in three axial directions of the electronic device, the three axial directions comprising an x-axis, a y-axis, and a z-axis;
    detecting whether absolute values of the acceleration components in the three axial directions are respectively less than predetermined thresholds in the three axial directions; and
    determining the shake amplitude of the electronic device is within the pre-set range, when the absolute values of the acceleration components in the three axial directions are detected all respectively less than the predetermined thresholds in the three axial directions.

3. The method of claim 1, wherein automatically capturing the image information acquired by the camera comprises:
    automatically capturing a predetermined number of frames of the image information according to a predetermined frequency, starting from a time when the shake amplitude of the electronic device is detected within the pre-set range; or
    automatically capturing the image information according to a predetermined frequency within a predetermined period of time starting from a time when the shake amplitude of the electronic device is detected within the pre-set range.

4. The method of claim 1, wherein, after automatically capturing the image information acquired by the camera, the method further comprises:
    detecting whether the captured image information complies with a pre-set effect; and
    deleting the picture captured by the camera and displaying an alert message on a screen of the electronic device, when the captured image information is detected that does not comply with the pre-set effect.

5. The method of claim 4, wherein detecting whether the captured image information complies with a pre-set effect comprises:
    detecting whether the captured image information contains a predetermined shape; and
    determining that the image information does not comply with the pre-set effect, when the captured image information is detected that does not contain the predetermined shape.

6. The method of claim 4, wherein detecting whether the captured image information complies with a pre-set effect comprises:
    detecting whether a value of an image element in captured image information is within a predetermined range, wherein the image element comprises pixel, brightness, hue, saturation, and combinations thereof; and
    determining that the image information does not comply with the pre-set effect, when the value of the image element in the captured image information is detected not within the predetermined range.

7. The method of claim 4, further comprising:
    before turning on the camera, receiving, by the electronic device, a shape or value ranges of image elements manually set by the user as the pre-set effect.

8. An image capturing apparatus, comprising:
    an acquisition module, configured to automatically acquire image information via a camera of an electronic device when the camera is turned on;
    a first detection module, configured to detect whether a shake amplitude of the electronic device is within a pre-set range; and
    a capturing module, configured to automatically capture the image information acquired by the acquisition module via the camera, when the first detection module detects that the shake amplitude of the electronic device is within the pre-set range, wherein the captured image information is a picture captured via the camera;
    wherein the first detection module comprises:
    a capturing unit, configured to capture continuous n frames of the image information acquired by the acquisition module;

a calculation unit, configured to calculate an image similarity between adjacent two frames of the continuous n frames of the image information captured by the capturing unit, where n is a natural number greater than 2; and a second determining unit, configured to determine that the shake amplitude of the electronic device is within the pre-set range, when the image similarity between every adjacent two frames of the continuous n frames calculated by the calculation unit is greater than a predetermined threshold for the image similarity.

9. The apparatus of claim 8, wherein the first detection module comprises:

an acquisition unit, configured to acquire acceleration components in the three axial directions of the electronic device, the three axial directions comprising an x-axis, a y-axis, and a z-axis;

a detection unit, configured to detect whether absolute values of the acceleration components in the three axial directions acquired by the acquisition unit are respectively less than predetermined thresholds in the three axial directions; and a first determining unit, configured to determine that the shake amplitude of the electronic device is within the pre-set range, when the detection unit detects that the absolute values of the acceleration components in the three axial directions are all respectively less than the predetermined thresholds in the three axial directions.

10. The apparatus of claim 8, wherein the capturing module comprises:

a first capturing unit, configured to automatically capture, according to a predetermined frequency, a predetermined number of frames of the image information acquired by the acquisition module via the camera, starting from a time when the first detection module detects that the shake amplitude of the electronic device is within the pre-set range; or a second capturing unit, configured to automatically capture, according to a predetermined frequency, the image information acquired by the acquisition module via the camera, within a predetermined period of time starting from a time when the first detection module detects that the shake amplitude of the electronic device is within the pre-set range.

11. The apparatus of claim 8, further comprising:

a second detection module, configured to detect whether the captured image information complies with the pre-set effect; and a deleting module, configured to delete the picture captured via the camera, when the second detection module detects that the captured image information does not comply with the pre-set effect; and a display module, configured to display an alert message on a screen of the electronic device, when the second detection module detects that the captured image information does not comply with the pre-set effect.

12. The apparatus of claim 11, wherein the second detection module comprises:

a first detection unit, configured to detect whether the image information captured by the capturing module contains a predetermined shape; and a first judging unit, configured to determine that the captured image information does not comply with the pre-set effect, when the first detection unit detects that the captured image information does not contain a predetermined shape.

13. The apparatus of claim 11, wherein the second detection module comprises:

a second detection unit, configured to detect whether a value of an image element of the image information captured by the capturing module is within predetermined ranges, wherein the image element comprises pixel, brightness, hue, saturation, and combinations thereof; and a second judging unit, configured to determine that the captured image information does not comply with the pre-set effect, when the second detection unit detects that the value of the image element of the captured image information is not within the predetermined ranges.

14. A non-transitory computer-readable medium having computer program for, when being executed by a processor, performing a method for image capturing, the method comprising:

automatically acquiring image information via a camera contained in an electronic device when the camera is turned on;

detecting whether a shake amplitude of the electronic device is within a pre-set range; and automatically capturing the image information acquired by the camera, when the shake amplitude of the electronic device is detected within the pre-set range, the captured image information being a picture captured by the camera;

wherein detecting whether the shake amplitude of the electronic device is within the pre-set range comprises:

capturing continuous n frames of acquired image information;

calculating an image similarity between adjacent two frames of the continuous n frames of the image information, wherein n is a natural number greater than 2; and determining the shake amplitude of the electronic device is within the pre-set range, when the image similarity between every adjacent two frames of the continuous n frames is greater than a predetermined threshold.

15. The non-transitory computer-readable medium of claim 14, wherein detecting whether the shake amplitude of the electronic device is within the pre-set range comprises:

acquiring acceleration components in three axial directions of the electronic device, the three axial directions comprising an x-axis, a y-axis, and a z-axis;

detecting whether absolute values of the acceleration components in the three axial directions are respectively less than predetermined thresholds in the three axial directions; and determining the shake amplitude of the electronic device is within the pre-set range, when the absolute values of the acceleration components in the three axial directions are detected all respectively less than the predetermined thresholds in the three axial directions.

16. The non-transitory computer-readable medium of claim 14, wherein automatically capturing the image information acquired by the camera comprises:

automatically capturing a predetermined number of frames of the image information according to a predetermined frequency, starting from a time when the shake amplitude of the electronic device is detected within the pre-set range; or automatically capturing the image information according to a predetermined frequency within a predetermined period of time starting from a time when the shake amplitude of the electronic device is detected within the pre-set range.

17. The non-transitory computer-readable medium of claim 14, wherein, after automatically capturing the image information acquired by the camera, the method further comprises:
 detecting whether the captured image information complies with a pre-set effect; and
 deleting the picture captured by the camera and displaying an alert message on a screen of the electronic device, when the captured image information is detected that does not comply with the pre-set effect.

* * * * *